United States Patent [19]

Baymak et al.

[11] Patent Number: 5,039,168
[45] Date of Patent: Aug. 13, 1991

[54] SAFETY SEAT BELT FOR A VEHICLE, ESPECIALLY AN AIRCRAFT

[75] Inventors: Faruk Baymak, Hamburg; Helmut Stueben, Gruenendeich, both of Fed. Rep. of Germany

[73] Assignee: Deutsche Airbus GmbH, Hamburg, Fed. Rep. of Germany

[21] Appl. No.: 552,817

[22] Filed: Jul. 13, 1990

Related U.S. Application Data

[62] Division of Ser. No. 185,889, Apr. 25, 1988, Pat. No. 4,941,710.

[30] Foreign Application Priority Data

Apr. 28, 1987 [DE] Fed. Rep. of Germany ....... 3714088

[51] Int. Cl.⁵ .............................................. A62B 35/00
[52] U.S. Cl. .................................... 297/471; 297/472
[58] Field of Search ............... 297/470, 471, 472, 468; 280/805, 801

[56] References Cited

U.S. PATENT DOCUMENTS

| | | | |
|---|---|---|---|
| 3,302,973 | 2/1967 | Ravau | 297/472 |
| 3,550,957 | 12/1970 | Radke | 297/472 |
| 3,861,744 | 1/1975 | Yamada | 297/472 |
| 3,891,272 | 6/1975 | Takada | 297/472 |
| 3,937,407 | 2/1976 | Matsuo | 297/472 X |
| 4,588,208 | 5/1986 | Yoshitsuga | 297/470 X |
| 4,854,608 | 8/1989 | Barral | 297/470 X |

FOREIGN PATENT DOCUMENTS

| | | | |
|---|---|---|---|
| 2614769 | 10/1977 | Fed. Rep. of Germany | 297/472 |
| 1015298 | 12/1965 | United Kingdom | 297/472 |

Primary Examiner—Laurie K. Cranmer
Attorney, Agent, or Firm—W. G. Fasse; D. H. Kane, Jr.

[57] ABSTRACT

In a belt strap for a restraint system for restraiing a passenger in a vehicle seat in the event of a collision, the belt strap includes regions which mechanically absorb energy. Such a seat belt includes elements for increasing the contact surface of the belt strap with the passenger's body so that the force transmitted to the passenger's body in the event of a collision is reduced. The belt may include colored material which discolors over time or plastically deformable colored threads to indicate if the belt's elasticity has decayed due to aging or due to over-extension of the belt. The belt has a modulus of elasticity which varies across its width so that the belt edges roll away from the passenger in the event of a collision. An information label indicating the expiration date of the usable duty lifetime of the safety belt may be provided.

5 Claims, 5 Drawing Sheets

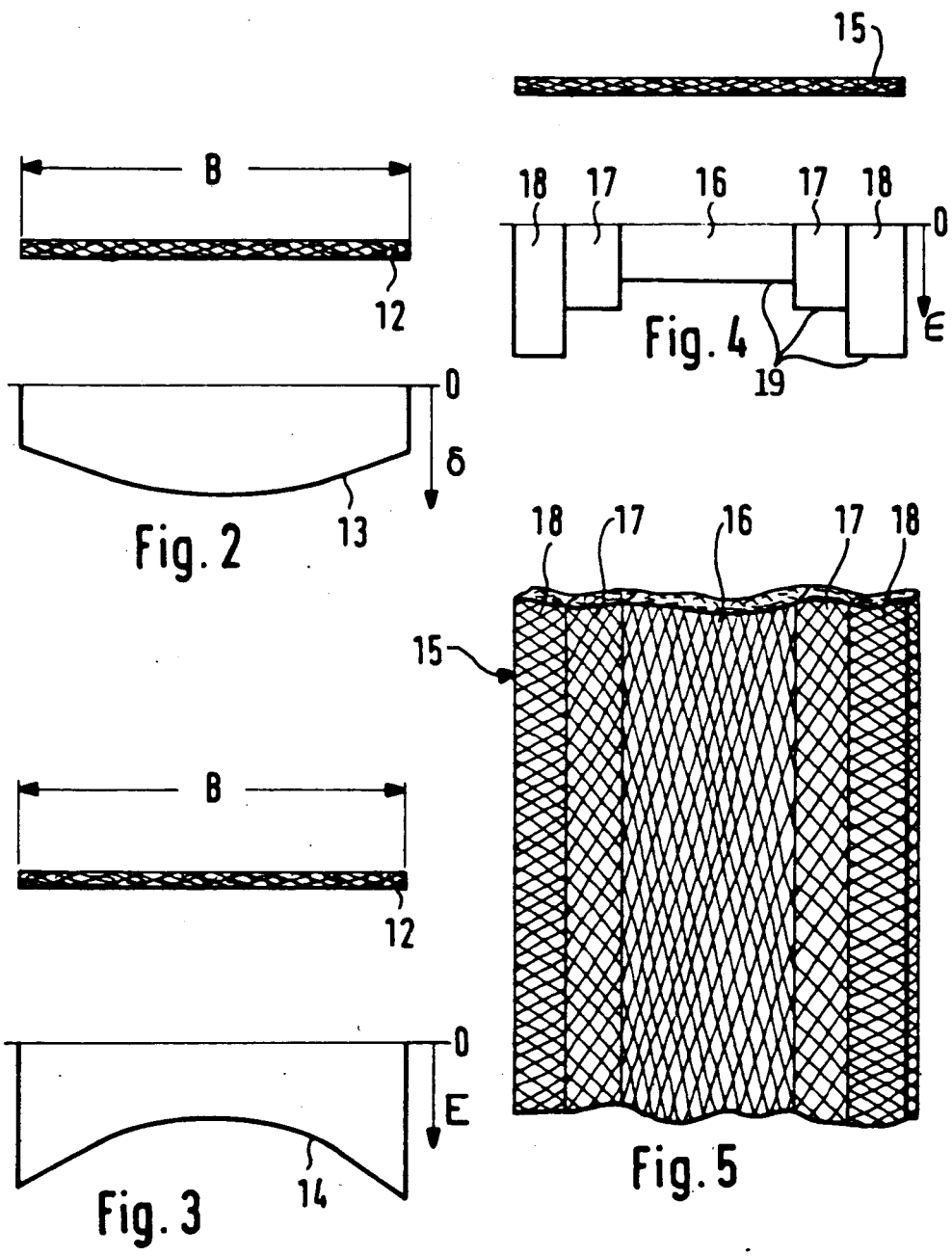

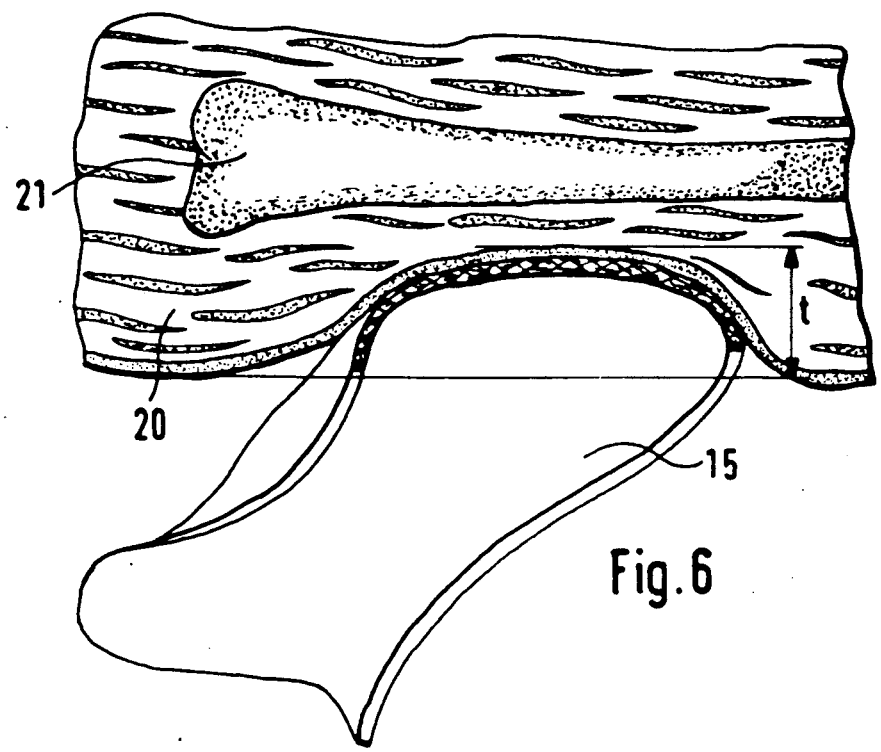
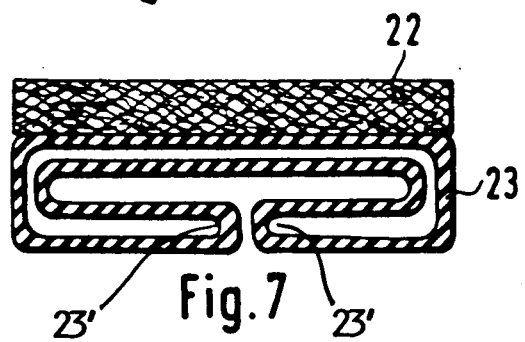
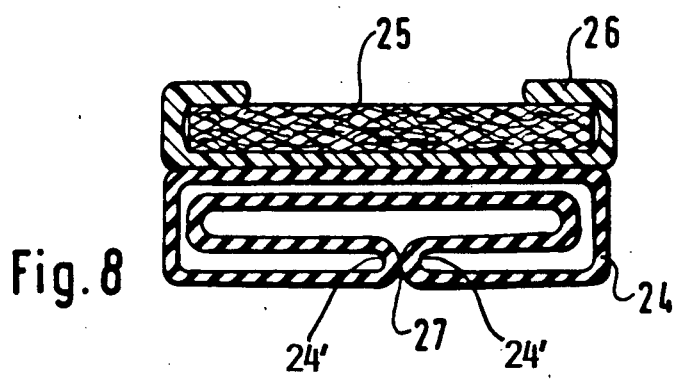

SAFETY SEAT BELT FOR A VEHICLE, ESPECIALLY AN AIRCRAFT

This is a division of application Ser. No. 185,889, filed Apr. 25, 1988, now U.S. Pat. No. 4,941,710.

FIELD OF THE INVENTION

The invention relates to a safety seat belt, more specifically to a belt strap for a restraining system in a vehicle, especially in an aircraft. Such belts restrain a person in the respective seat in the event of an accident or collision.

DESCRIPTION OF THE PRIOR ART

Known belt straps used for restraining systems in vehicles can themselves become quite dangerous during a high speed collision accident. Namely, serious injuries of the restrained passengers may be caused by the restraining belts because they have a rather stiff or non-elastic characteristic despite known measures for reducing the arising belt forces. Such measures for reducing the arising belt forces include the selection of the characteristic elasticity of the belt strap and/or the use of mechanical devices for absorbing energy.

German Patent Publication (DE-PS) 1,755,464 discloses an energy absorber for safety belts or seats of vehicles. The energy absorber has a rotatably supported drum onto which a bendable or flexible element is rolled up. A friction brake in the form of a lamellar multiple plate or disk brake acts on the drum. Such a structure, however, requires a relatively high mechanical effort and expenditure, whereby the proper adjustment of the lamellar friction or disk brake is extremely critical with respect to the safety and security of the restrained passenger. It can be assumed that this prior known restraint system has not become widely accepted because of the risks which are possibly involved therewith.

Investigations of accidents involving injuries to passengers caused by typical known belt straps, show that for typical impact durations and belt stretching on the one hand, and for the subjective organ dependent and locally variable belt dependent body tissue loading of a passenger on the other hand, the resulting forces often exceed allowable values. Furthermore, all belt straps are subject to an aging process, whereby the belt's original elasticity decreases over time. A further loss of elasticity of the belt strap arises through over-stretching which may be caused by accident loading of the belt. Belt straps which have been damaged in this manner should be replaced for reasons of safety. However, such belt replacement is often neglected because the dangerous changes of the mechanical characteristics of a typical belt strap are not directly evident to visual inspection.

OBJECTS OF THE INVENTION

In view of the foregoing it is the aim of the invention to achieve the following objects singly or in combination:

to provide a safety belt strap for securely restraining a passenger in a vehicle seat during an accident or collision while effectively reducing forces transmitted by the belt to the body tissues of the restrained passenger;

to provide a degree of elasticity in such a belt strap as well as energy absorbing mechanical elements so that peak forces arising during a collision are absorbed; and to provide visual indicators in such a belt so that the loss of belt elasticity due to aging or accidental overloading or overstretching of the belt is made evident to visual inspection.

SUMMARY OF THE INVENTION

The above objects have been achieved in a restraining system belt strap for keeping a passenger restrained in a seat of a vehicle in the event of an accident, wherein the belt strap includes zones for mechanically absorbing energy and means for increasing the contact surface of the belt strap.

The belt zones for absorbing energy may be in the form of a specialized woven webbing structure. These zones may, for example, be made of a material having a predetermined deformability. The energy absorbing zones may be symmetrically or unsymmetrically arranged, e.g. they may be running parallel to the belt strap axis. The zones may have difficult moduli of elasticity, whereby the modulus of elasticity decreases from the middle toward the edges of the belt strap. The zones may further include woven-in lengthwise fibers which have a predetermined plastic deformability and which are tinted with a conspicuous color. Alternatively, the zones for absorbing energy may be in the form of successive overlaps of material, whereby adjacent overlaps are interconnected with stitching having a definite strength.

In order to increase the contact surface of the belt strap an inflatable hose having a C-cross-section or various folded shapes may be provided. Finally, an information label may be affixed to the belt to indicate a date of expiration of the reliable duty lifetime of the belt strap. Additionally, the belt may be colored by a die which discolors over time so as to indicate an age induced expiration.

The safety belt strap as described above achieves advantages including a considerable reduction in the number of serious injuries caused by safety belts during accidents or collisions. Furthermore, the described belt strap may easily be examined for loss of elasticity, especially such as were caused by any stretching of the belt which may have occurred, so that an exchange or replacement of the belt strap may be carried out without delay.

BRIEF DESCRIPTION OF THE DRAWINGS

In order that the invention may be clearly understood, it will now be described, by way of example, with reference to the accompanying drawings wherein:

FIG. 2 shows a curved stress characteristic along a cross-section through a belt strap;

FIG. 3 shows a curved strain characteristic along a cross-section through a belt strap;

FIG. 4 shows a prescribed stepwise strain characteristic along a cross-section through a belt strap;

FIG. 5 is a partial perspective view of a belt strap;

FIG. 6 is a partial cross-section of a belt strap restraining a passenger during an accident;

FIG. 7 is a cross-section of a belt strap with an inflatable hose having a C-shaped cross-section;

FIG. 8 is a cross section of a belt strap with a carrier and an inflatable hose;

DETAILED DESCRIPTION OF PREFERRED EXAMPLE EMBODIMENTS AND OF THE BEST MODE OF THE INVENTION

Figure 1:
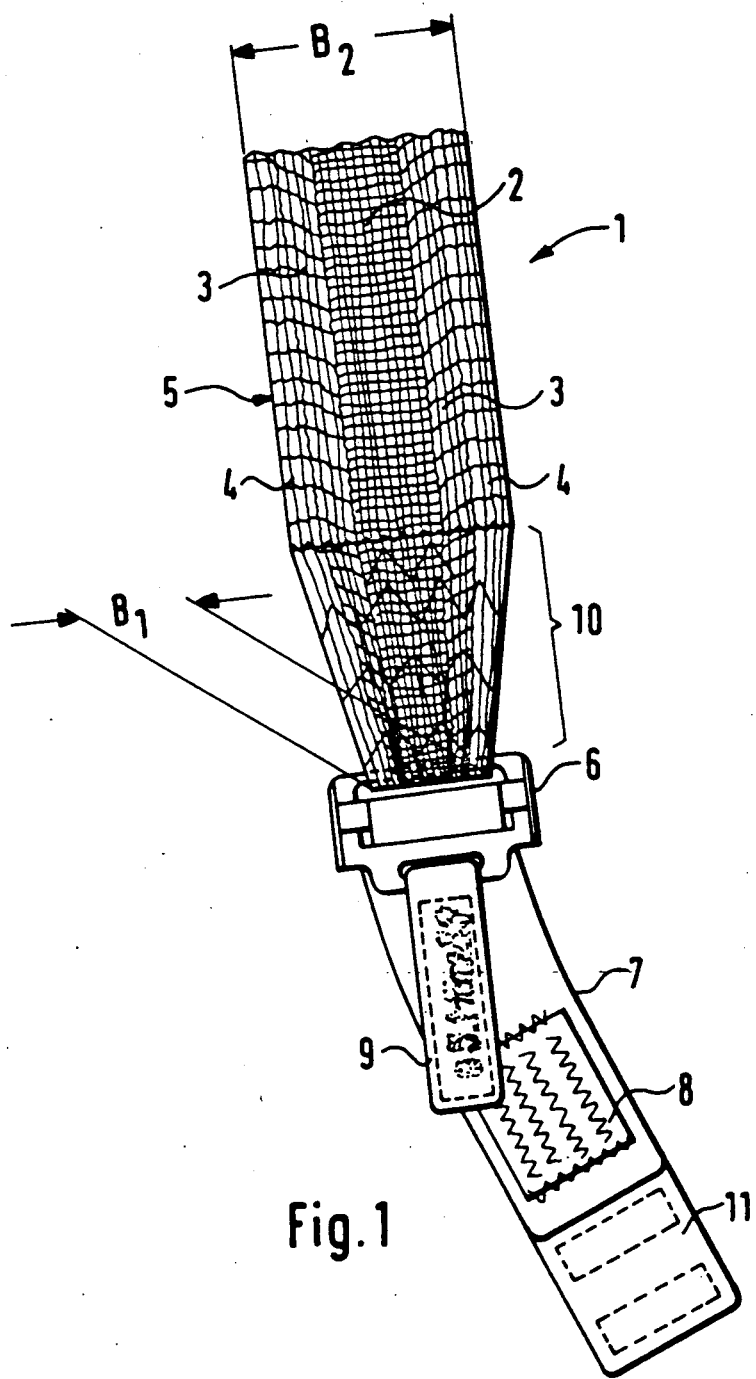
FIG. 1 is a schematic partial view of a safety belt system.

FIG. 1 shows a portion 5 of a belt 1 forming a part of a safety belt system. The belt portion 5 includes a lengthwise extending middle zone 2, two intermediate zones, 3, and two edge zones 4. The belt zones 2, 3, 4 are arranged symmetrically about the lengthwise axis of the belt portion 5 and each respectively comprises a prescribed certain elasticity value. The safety belt system further includes a belt section 7 with a safety overlap structure 8, whereby the belt section 7 is connected to the belt portion 5 by means of an adjustable hardware fitting 6 forming a belt lock. An information label 9 showing the latest date until which the elasticity values of the material will be maintained is attached to the fitting 6. The elasticity values of the separate zones 2, 3, and 4 are successively reduced in steps so that the respective modulus of elasticity of the belt 1 is reduced stepwise from the middle to the outer edges. Therefore, an increased energy absorption is possible in the edge zones 4 of the belt. Different weaving patterns, as well as different materials may be used in order to achieve the appropriate corresponding characteristics in the different zones. The belt passage opening of the fitting 6 has a typical width $B_1$ whereas the belt 1 has a wider width $B_2$. A tapered section 10 forms a transition from the width $B_1$ to the width $B_2$.

In the event of an accident or collision resulting in very high belt forces, the edges of the belt 1 roll or deflect toward the outside, that is, away from the restrained person. Thus, the cross-section of the belt 1 will show corresponding rounded or rolled sections in the edge zones of the belt. In this manner the local loading of the affected muscle or organ tissues is decreased in the area of the edges of the belt. Simultaneously, by means of widening the belt to the widened width $B_2$, the specific pressure loading of the affected body tissues is reduced. Furthermore, the security overlap structure 8, arranged in the belt section 7 between the fitting 6 and a clamping end 11, serves to reduce or absorb the peak belt loading in that the overlap structure 8 absorbs energy when the belt force reaches a certain value. This feature is achieved in that the belt is overlapped or looped back on itself at this location and the overlapping belt sections are interconnected by a stitching seam having a predetermined strength. When a belt load or belt force arises which is greater than the strength of the stitched seam or interconnection, then the stitching rips while absorbing energy until the belt forces have been reduced. Thus, by means of the above described measures, the danger of serious injuries is substantially reduced. Furthermore, a simple visual inspection of the information label 9 at any time will clearly indicate whether the allowable duty life of the belt strap, as limited by aging of the material, has expired or not.

FIG. 2 shows a cross-section through a belt strap 12, essentially according to FIG. 1, having a width B. FIG. 2 further shows a graph of the distribution 13 of stress $\delta$ across the width B of the belt 12 as it would arise during loading of the belt in the event of an accident. According to the invention the stress curve 13 shows a low tension value near the two edge zones, and greater tension near the belt midline, whereby the loading of the body tissues of a person restrained by the belt is considerably reduced at the belt edge zones relative to prior known belt straps.

FIG. 3 again shows a cross-section through the belt 12 according to FIG. 2, but also shows a graph of the distribution 14 of the strain $\epsilon$ across the width B of the belt 12. The strain curve 14 shows that the strain is greater near the belt edges than it is near the belt middle region. The production of such belt straps having a continual or smooth varying stress and strain characteristic is possible, but is not absolutely necessary for achieving the desired belt characteristics according to the invention.

In this context, FIG. 4 shows a cross-section through a belt strap 15 comprising a center zone 16, two intermediate zones 17 and two edge or side zones 18. Thereby, each separate zone 16, 17, or 18 is produced with an appropriate selection of materials or fibers or by using different weaving patterns so that the elastic characteristic is substantially constant across each respective zone. The curve 19 representing the distribution of strain $\epsilon$ across the width of the belt strap 15 approximates, in a linear stepwise manner, the characteristic curve 14 shown in FIG. 3.

FIG. 5 shows a partial perspective side view of the belt strap 15 of FIG. 4 with the zones 16, 17, and 18. The separate zones are differentiated by being shown with different cross-hatchings which indicates, for example, a different weaving pattern. The low modulus of elasticity of the outer zones 18 is achieved by using lengthwise fibers or threads having a relatively large compliance or resilience. Certain regions of the belt comprise lengthwise threads woven-in, which are made of a material having a prescribed plastic deformability and having a conspicuous color, for example, signal red. If the belt strap is over-extended, these plastically deformable fibers or threads will be plastically or permanently deformed and maintain an increased length even if the other fibers of the belt strap again contract following an over-extension. The plastically deformed threads will thereby buckle toward the outside through appropriate gaps in the weave and become clearly visible due to their conspicuous color, whereby an unallowable over-extension of the belt strap is indicated and easily discovered. In order to identify or characterize the separate zones having different elasticities in a belt of several different zones, each zone may comprise a different color. In this manner a belt strap of this type is clearly recognizable as such.

FIG. 6 shows the above described belt 15 in use for restraining a passenger, whereby the belt 15 presses against and depresses a body part comprising muscle tissue 20 and a bone 21. Clothing has been omitted from the drawing for the sake of clarity. As shown in this example, the belt 15 has depressed the tissue 20 by a depth t. Because of the locally varying strain characteristics of the belt 15, the edges of the belt are rolled outwardly, that is, away from the passenger's body. This feature or advantage of the invention is important because it eliminates, or at least considerably reduces, the cutting effect of the belt edges in prior art seat belts. While apparently the effective contact surface of the belt is reduced as a result of the edge curvature, this effect is compensated for because the belt strap has been widened overall to the width $B_2$ as described above. A considerably more effective reduction of body tissue injuries has been achieved by the widened belt simultaneously comprising a tensile stiffness which decreases toward the belt edges according to the invention than could be achieved by a wider belt which comprises a constant or uniform tensile stiffness across its width.

FIG. 7 shows another embodiment of the present belt strap, whereby a strap 22 is provided with an inflatable air hose 23 shown in a folded stored state. The inner space of the hose 23 is inflated by a pressurized gas in the event of an accident. In the folded state, the interior of the hose 23 has a cross-section having a C-shape extending horizontally and opening downwardly. The hose 23 is appropriately folded lengthwise so that it does not extend beyond the edge of the strap 22. The open side of the C-shape faces the person to be restrained. In the event of an accident or collision, the hose 23 is automatically filled with a pressurized gas and thereby forms an enlarged contact surface for the belt 22 against the body of the passenger since the edge zones 23' will bulge outwardly in response to inflation. The hose 23 is held in its normal folded state by thin threads or other attachment means which are not shown and which are easily ripped by the force of the pressurized gas when the hose 23 is inflated in response to a pull as a result of an accident.

FIG. 8 shows a further embodiment of the invention, whereby a hose 24 is not directly attached to the belt strap 25, but instead is attached thereto by means of a carrier 26. The carrier 26 is slidable along the belt strap 25 and thereby may be moved or adjusted to the proper position for different passengers using the safety belt. Along the seam 27, the adjacent edges 24' of the folded hose 24 are glued together. In the event of an accident, pressurized gas inflates the hose 24 and separates the glued seam 27 so that the hose 24 may expand to the prescribed inflated shape. As an alternative which is not shown, a preferential rupture seam connected by a thin web of material may be provided instead of a glued seam along the seam 27.

Figure 9:
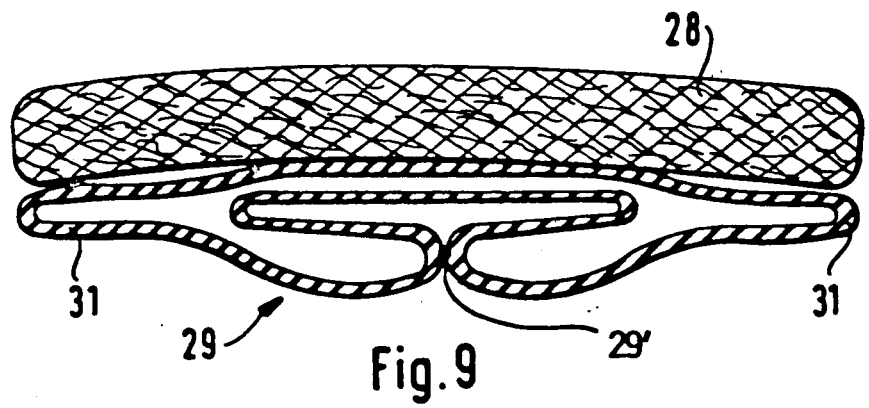
FIG. 9 is a cross-section of a belt strap with a hose having a C-shaped cross-section with edge extensions.

FIG. 9 shows a further embodiment of the invention with a belt strap 28 and an inflatable hose 29 having a cross-section which again has essentially a C-shape, but with added outer extensions 31, which will bulge horizontally outwardly, as seen in FIG. 9, when a frangible seam 29' bursts in response to inflation.

Figure 10:
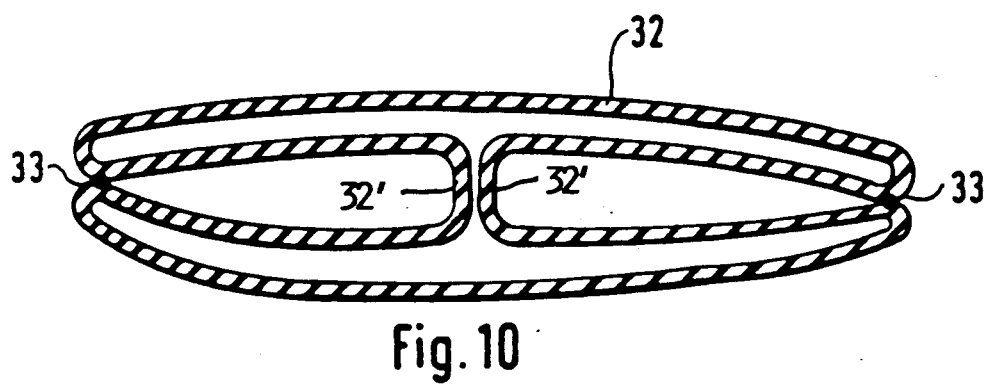
FIG. 10 is a cross-section of a hose with attachment stitching along the edges.

FIG. 10 shows an embodiment of a hose 32 having a cross-section resembling roughly a figure-eight shape, whereby attachment stitchings 33 or another suitable attachment is provided between adjacent folds along the outer edges. Upon inflation the loops 32' will bulge outwardly.

Figure 11:
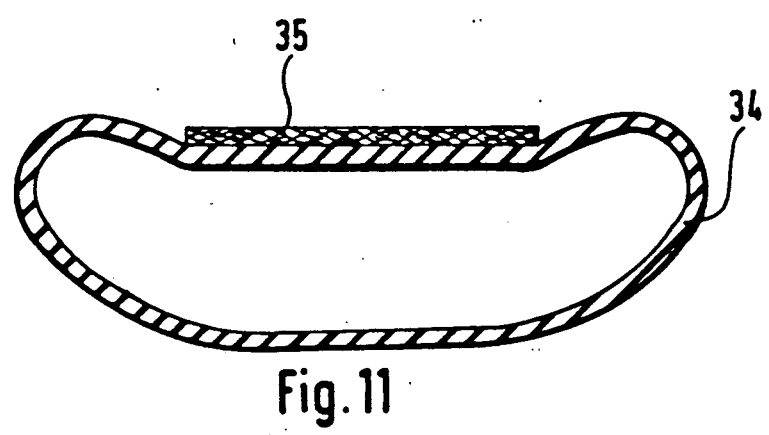
FIG. 11 is a cross-section of a belt strap with a hose in an inflated state.

FIG. 11 shows a hose 34 in the inflated state which would be caused in the event of an accident, whereby the hose 34 is inflated and located between a belt strap 35 on one side and the body of a passenger, not shown, on the other side. It is clearly visible that the hose 34 extends beyond the edges of the belt strap 35 so that the contact surface of the belt 35 is considerably enlarged. The rounded shape of the hose prevents injuries to people caused by the otherwise sharp edges of prior belts.

Figure 12:
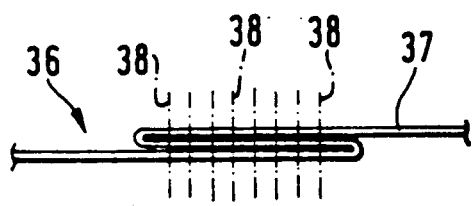
FIG. 12 is a side view of a safety overlap structure.

FIG. 12 is a side view of a safety overlap structure 36, whereby the belt strap 37 is overlapped in an S-shape and adjacent overlapping layers of the overlap area 36 are interconnected by means of stitchings 38 having a defined strength. In the event of an accident resulting in excessive belt forces, the separate lines of stitching 38 are ripped in succession, one after another, whereby force peaks which would otherwise be dangerous may be absorbed and reduced.

Figure 13:
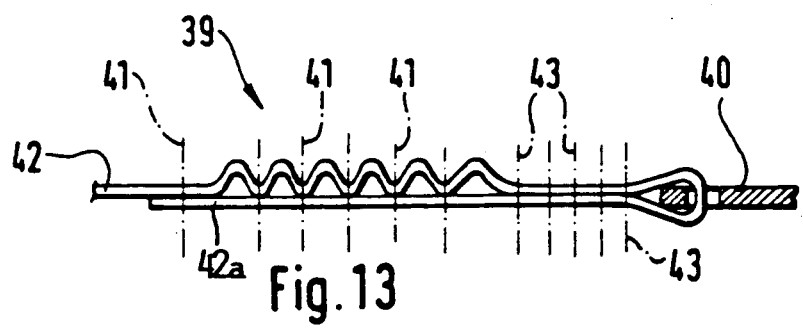
FIG. 13 is a side view of another safety overlap for a belt strap.

FIG. 13 shows an embodiment of a safety overlapping structure 39 of belt section 42, 42a in an area near a metal fitting 40 to which the belt strap is attached. The upper continuing portion of the belt section 42 is pleated or wavy in the area of the overlap 39 and is attached to the bottom cut-off end of the belt section 42a by means of stitchings 41. The threads used for the stitchings 41 absorb energy through deformation when a predetermined belt load is exceeded. Further stitchings 43 are high strength rigid attachment stitchings assuring that the belt structure 39 remains attached to the metal fittings 40. The stitchings 41 form a seam extending substantially along the valleys between ridges formed by the pleats or waveform in the belt section 42. The downwardly facing belt section in FIG. 13 is not pleated.

Figure 14:
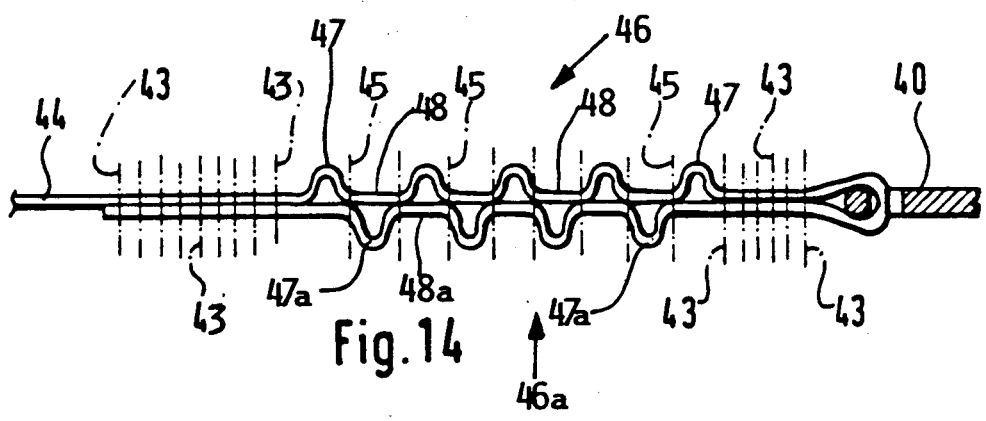
FIG. 14 is a side view of a further safety overlapping for a belt strap.

FIG. 14 shows a further advantageous embodiment of the invention of a belt strap 44 the end of which is near its end region attached to a metal fitting 40. The upper and lower belt sections 46 and 46a of the belt 44 comprise alternating pleated ridges 47, 47a and flat valleys 48, 48a, whereby the ridges 47 and valleys 48 of the upper belt section 46 are phase shifted relative to the valleys 48a and ridges 47a of the lower belt portion section 46a and vice versa. The adjacent upper and lower belt sections are connected to each other by means of stitching 45 which stretches or rips appropriately as described above under excessive belt loading. The seams formed by the stitchings 45 are preferably located where the flat valleys merge into the ridges. High strength rigid stitching 43 is also provided to reliably attach the belt 44 to the metal fitting 40.

A further embodiment of the invention teaches that the material of the belt strap is at least partially tinted or dyed with a coloring agent which discolors over time and thereby can be used as an indicator of the expiration of the allowable duty lifetime. The cross-hatching of the central zone 16 in FIG. 5 may represent such a coloring or tinting. The following coloring agents are examples suitable for the present purposes: Inorganic pigments based on aniline. Although the invention has been described with reference to specific example embodiments, it will be appreciated, that it is intended to cover all modifications and equivalents within the scope of the appended claims.

What we claim is:

1. A belt strap for restraining a passenger in a seat in a vehicle in case of an accident, comprising a first belt section and a second belt section overlapping said first belt section and defining a belt plate between the two belt sections, at least one of said belt sections having pleats therein with a pleat amplitude extending substantially perpendicularly to said belt plane, and stitched seams extending through both belt sections at least where pleat portions of one belt section contact the other belt section, said stitched seams having a defined strength.

2. The belt strap of claim 1, wherein said pleats have curved ridges and curved valleys following each other, said curved valleys forming said pleat portions contacting said other belt section, and wherein said stitched seams extend along said valleys.

3. The belt strap of claim 1, wherein said pleats have curved ridges and flat valleys spacing said curved ridges from each other, and wherein said stitched seams extend along lines where said flat valleys merge into said curved ridges.

4. The belt strap of claim 1, wherein each of said belt strap sections has pleats therein with curved ridges and flat valleys spacing said curved ridges from each other, wherein said curved ridges and flat valleys in one belt section are phase shifted relative to the curved ridges and flat valleys of the other belt section so that curved ridges in one belt section are located opposite flat valleys in the other belt section and vice versa, and wherein said stitched seams extend along lines substantially where said flat valleys merge into said curved ridges.

5. The belt strap of claim 1, further comprising additional stitched seams of defined strength, said additional stitched seams extending through said belt sections outside said pleats.

* * * * *

UNITED STATES PATENT AND TRADEMARK OFFICE
CERTIFICATE OF CORRECTION

PATENT NO. : 5,039,168
DATED : August 13, 1991
INVENTOR(S) : Faruk Baymak, et. al.

It is certified that error appears in the above-identified patent and that said Letters Patent is hereby corrected as shown below:

In the Abstract [57], line 1, replace "restraiing" by
--restraining--;
in claim 1, column 6, line 56, replace "plate" by --plane--.

Signed and Sealed this

Fifteenth Day of December, 1992

*Attest:*

DOUGLAS B. COMER

*Attesting Officer*     Acting Commissioner of Patents and Trademarks